(No Model.)
P. J. PARMITER.
HARROW.
No. 389,593. Patented Sept. 18, 1888.
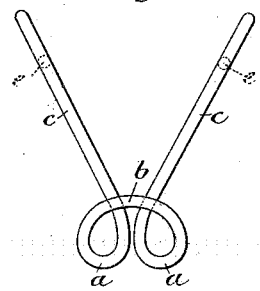
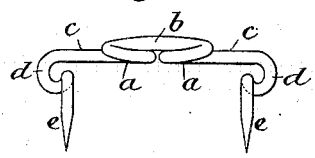 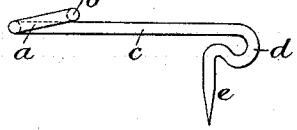
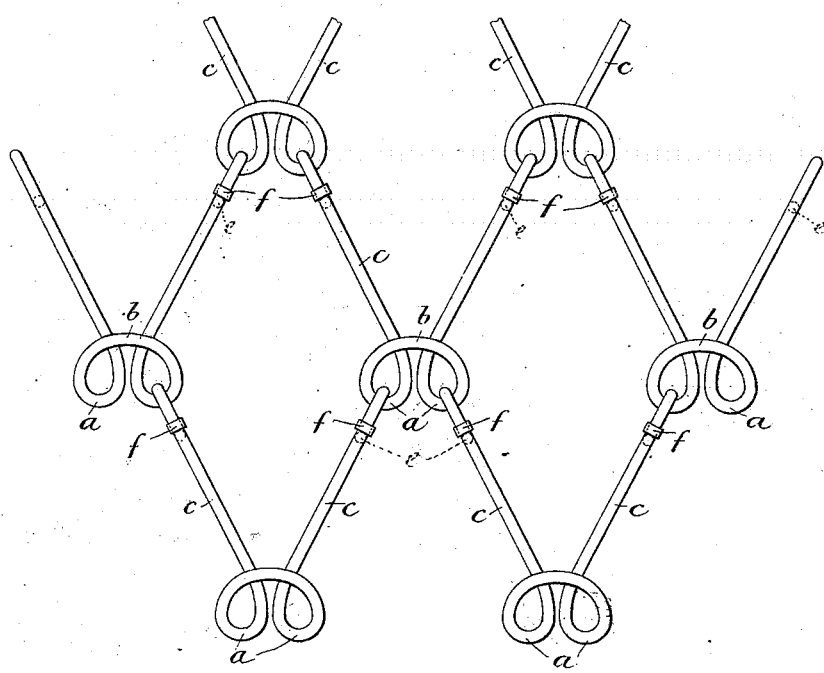
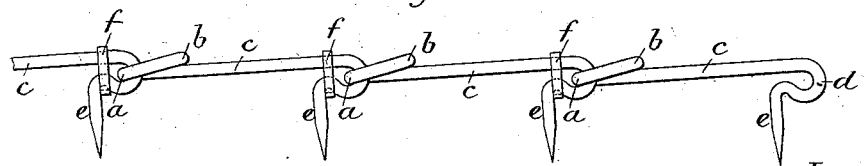
Witnesses  
Will T. Norton  
Inventor  
Philip J. Parmiter  
by John J. Halsted  
his Attys.

United States Patent Office.

PHILIP JOSEPH PARMITER, OF ANSTY, NEAR SALISBURY, ENGLAND.

HARROW.

SPECIFICATION forming part of Letters Patent No. 389,593, dated September 18, 1888.

Application filed May 8, 1888. Serial No. 273,219. (No model.) Patented in England April 27, 1885, No. 5,162.

*To all whom it may concern:*

Be it known that I, PHILIP JOSEPH PARMITER, a subject of the Queen of Great Britain, residing at Ansty, near Salisbury, England, have invented new and useful Improvements in Harrows, of which the following is a specification.

My invention relates to link or chain harrows—that is to say, to harrows which are composed of a number of link-sections united together.

The chief object of my said invention is to provide a harrow of this class the tines or teeth of which are integral with or form a continuation of the respective links by which they are carried.

In the accompanying drawings, Figure 1 is a plan of one of the link-sections of which my improved harrow is composed. Fig. 2 is a side view of the same, and Fig. 3 is an end view. Fig. 4 is a plan view showing a number of links united together as when in use, and Fig. 5 is a side view of the same.

Each link of the harrow is composed of a single rod of iron or steel. This rod is bent at the center, as shown in Fig. 1, so as to form two eyes, $a\,a$, (the bow $b$ lying either above or below the bars $c\,c$,) and at some distance from the ends, as shown in Figs. 2 and 3, to form the hooks $d$. The portions of the rod beyond the hooks are bent to substantially vertical positions to form the tines $e$.

The bars $c\,c$ can be of any desired length, and may be set at any required angle, according to the distance desired between the tines $e$.

Any desired number of links (according to the size of harrow required) can be connected together, as shown in Figs. 4 and 5, each tine $e$ being passed through one eye $a$ of an adjacent link, so that the hooks $d\,d$ engage with the said eyes. After the links have been connected to the eyes, as hereinbefore described, strips $f$, of metal, are preferably bent around the bars $c$ and the hooks $d$, as shown in Figs. 4 and 5, so as to maintain the tines substantially rigid. These rings or strips also serve to cut the surface of the ground when the harrow is worked upon its back. By forming the bows $b$ upon the links the latter are made sufficiently rigid to enable the harrow to be pulled in a diagonal direction, so that each tine will cut fresh ground and not run in the track of another.

Having now particularly described and ascertained the nature of my said invention and in what manner the same is to be performed, I declare that what I claim is—

1. In a chain harrow, a link formed by bending a rod, substantially as hereinbefore described, so as to form the eyes $a\,a$, the hooks $d\,d$, and the tines $e\,e$, as set forth.

2. A chain harrow composed of numerous links, each made of a rod bent to form the two central adjacent eyes, $a\,a$, and also to constitute two terminal hooks, $d\,d$, and tines $e\,e$, these central eyes severally being connected with one of the hooks of other similar links.

3. In combination with a link bent to form the eyes $a\,a$ and the hooks $d\,d$ and tines $e\,e$, the annular strips $f$, made as described and separately applied one to each hook.

PHILIP JOSEPH PARMITER.

Witnesses:
 E. F. NORTON,
 GEO. H. DAVIS,
*Clerks to Mr. Hodding, Solr., Salisbury.*